Sept. 1, 1970 G. L. CLAPPER 3,526,759

PARALLEL BINARY TO PARALLEL BINARY CODED DECIMAL CONVERTER

Filed Nov. 15, 1967 5 Sheets-Sheet 1

INVENTOR
GENUNG L. CLAPPER

BY Hanifin and Clark
ATTORNEY

PARALLEL BINARY TO PARALLEL BINARY CODED DECIMAL CONVERTER

Sept. 1, 1970 G. L. CLAPPER 3,526,759

PARALLEL BINARY TO PARALLEL BINARY CODED DECIMAL CONVERTER

Filed Nov. 15, 1967 5 Sheets-Sheet 3

PARALLEL BINARY TO PARALLEL BINARY CODED DECIMAL CONVERTER

Filed Nov. 15, 1967 5 Sheets-Sheet 5

United States Patent Office 3,526,759
Patented Sept. 1, 1970

3,526,759

PARALLEL BINARY TO PARALLEL BINARY CODED DECIMAL CONVERTER

Genung L. Clapper, Raleigh, N.C., assignor to International Business Machines Corporation, Armonk, N.Y., a corporation of New York Filed Nov. 15, 1967, Ser. No. 683,367
Int. Cl. G06f 5/00
U.S. Cl. 235—155 7 Claims

ABSTRACT OF THE DISCLOSURE

A parallel binary to parallel binary coded decimal (BCD) converter comprised of a binary storage register, a first distribution means, a digital expander means, a second distribution means, a BCD mixer means, and adding means. The output of the adding means being the BCD equivalent of the binary number stored in the binary storage register.

BACKGROUND OF THE INVENTION

Field of the invention

The field of the invention involves subject matter relating to communication by means which are in part or in whole electrical. More specifically, the field of the invention relates to subject matter for transmitting coded sets of pulses and having means to translate one code into another.

Prior art

This invention relates to conversion systems and more particularly to a system for performing a high speed conversion of a number in binary form to its equivalence in binary coded decimal form.

Efforts to convert parallel to parallel have been too expensive from time delay and/or component considerations. A "standard" approach would be to convert the binary number to a decimal number by counting down a binary scaler counter containing the binary number while counting up a decimal counter. When the binary counter contains zero, the decimal counter contains the decimal number, perhaps in binary coded decimal form. It can be realized that this is a very time consuming approach. A second approach would be to convert a binary number into its binary coded decimal equivalent by diode logic expansion. This method entails the conversion of the binary number into its equivalent decimal value, then the equivalent decimal value is converted into its binary coded decimal equivalent value.

FIG. 1 shows the prior art approach to parallel conversion of a binary number into its binary coded decimal equivalent. It should be noted that the bit position $2^0$ of the binary storage register is not expanded. There is no need to expand the $2^0$ bit since it only supplies odd/even information to the binary coded decimal equivalent number and is in fact equal to the low order bit position in the unit place of the binary coded decimal equivalent.

Digital expander 2 shows the expansion of the remaining bit positions of the binary storage register 1 to form all discrete decimal values that are capable of being formed by all the combinations and permutations of the remaining bit positions of the binary storage register 1. It should be noted that digital expander 2 may include the necessary inverters to create the expression for each input if this information is not obtainable from the binary indicator stages of the binary storage register 1. The decimal output lines of the digital expander 2 are then partitioned into their binary coded decimal (BCD) components. BCD mixer 3 has a plurality of OR circuits for OR'ing like BCD components of different digital lines.

It can be seen from FIG. 1 that in order to provide the conversion of the binary number to the binary coded decimal equivalent that only 3 diodes were necessary to perform this function. However, as the binary storage register increases in size, the number of diode necessary to perform the necessary function of digital expanding and BCD mixing increases on the exponential. For example, if the binary storage register had thirteen bit positions, it would require the digital expander to contain 4,096 AND circuits, each AND circuit having twelve input arms. It therefore can be seen that the digital expander would require approximately 50,000 diodes and the BCD mixer would require approximately 20,000 diodes.

A further study would show that a binary number having 20 bit positions would necessitate the use of over 12 million diodes between the digital encoder and the BCD mixer to perform the desired code conversion. The numbr of diodes needed to perform the necessary digital expanding and the BCD mixing increase on the exponential as the number of bit positions in the binary storage register increase. As the number of binary positions within the binary number increase, it becomes uneconomical from a component standpoint to convert a binary number into its binary coded decimal equivalent by the diode expansion means.

SUMMARY OF THE INVENTION

Therefore, an object of the present invention is to provide an improved high speed parallel binary to parallel binary coded decimal converter.

A further object of the invention is to provide a parallel binary to parallel binary coded decimal converter employing a substantially reduced number of components to obtain the same result as provided for by the prior art.

Another object of the invention is to provide a parallel binary to parallel binary coded decimal converter which employs a look ahead correction into a binary adder to obtain a corrected summation of a plurality of BCD numbers.

Briefly, the invention addresses itself with the problem of translating a binary number into its binary coded decimal (BCD) equivalent. It is the purpose of this invention to provide such a code converter while maintaining a high speed characteristic and while employing a minimum number of components. The parallel binary to parallel binary coded decimal converter embodies the concept that when a given binary number of a length sufficiently long enough to make it uneconomical for conversion by the prior art technique, then conversion can be performed by partitioning that binary number into two or more other binary numbers having such characteristics that lend themselves to be easily converted into their respective binary coded decimal equivalents. The respective binary coded decimal equivalents are added together to obtain the binary coded decimal quivalent of the original binary number to be converted.

In general, the parallel binary to parallel binary coded decimal converter incorporates a binary storage register 4 for the purpose of setting into the converter the binary number to be converted. The output lines of the binary indicator stages of the binary storage register 4 are grouped in such a way as to create two or more new apparent binary storage registers which when added together will return the original binary number stored in the original binary storage register 1. The binary number stored in the new apparent binary storage registers are then converted into their respective binary coded decimal equivalents by means of digital expanders 5, 6, and BCD mixers 7, 8. The respective outputs of the BCD mixers 7, 8 are then added together by one of several adding techniques in adder 9 to obtain a binary coded decimal number in adder 9 to obtain a binary coded decimal number that is the BCD equivalent of the number that is stored in the binary indicator storage register.

BRIEF DESCRIPTION OF THE DRAWINGS

The foregoing and other objectives, features and advantages of the invention will be apparent from the foregoing more particular description of the preferred embodiments of the invention, as illustrated in the accompanying drawings.

In the drawings.

DESCRIPTION OF THE PREFERRED EMBODIMENTS

To provide a clear description of the invention in its operation the invention will be described by means of two preferred embodiments. It should be understood that it is not the intent to limit the scope of the invention by using as examples these two specific preferred embodiments.

DESCRIPTION OF EMBODIMENT 1

Figure 2:
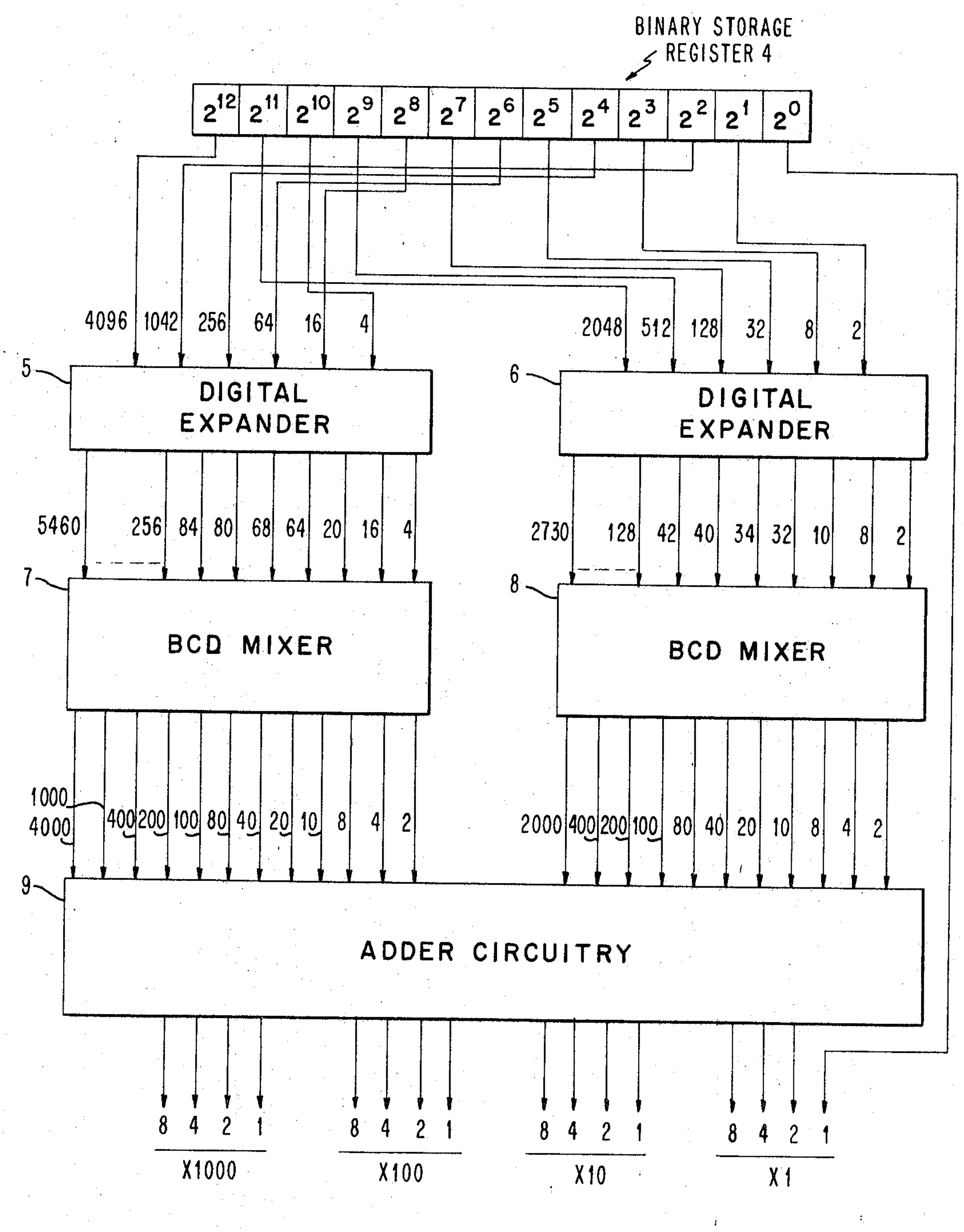
FIG. 2 is a block diagram showing a first embodiment of the improved parallel binary to parallel binary coded decimal converter.

In reference to FIG. 2, a parallel binary to parallel binary coded decimal converter for converting a thirteen bit binary number into its BCD equivalent. It should be noted that the inventor is using as an example a thirteen bit number only for illustrative purposes and that the invention can be used by binary numbers that exceed thirteen binary bits.

The first embodiment of this invention comprises a binary storage register 4 which contains thirteen binary indicator stages $2^0$ and $2^{12}$ for storing a thirteen bit binary number. The thirteen binary indicator stages of the binary storage register 4 may take the form of the well-known bistable multivibrators, relays or any other well-known binary indicator. Each binary indicator stage is associated with one position of the binary number and therefore represents a position of a binary number having a fixed binary value and an associated decimal value. This is to say that the binary indicator stage $2^0$ is associated with the $2^0$ position of the binary number in the binary storage register 4 and has a binary value represented by $2^0$ or a decimal value equal to 1.

The output from the binary storage register 4 is grouped in such a fashion that the binary storage register 4 appears to be two separate binary storage registers. The first of these apparent binary storage registers contain a binary number that only allows a "1" to be contained by the binary bits that are associated with the binary indicator stages, $2^{12}$, $2^{10}$, $2^8$, $2^6$, $2^4$, $2^2$ of the binary storage register

4. The second apparent binary storage register is associated with the binary indicator stages $2^{11}$, $2^9$, $2^7$, $2^5$, $2^3$, $2^1$, of the binary storage register 4.

Figure 1:
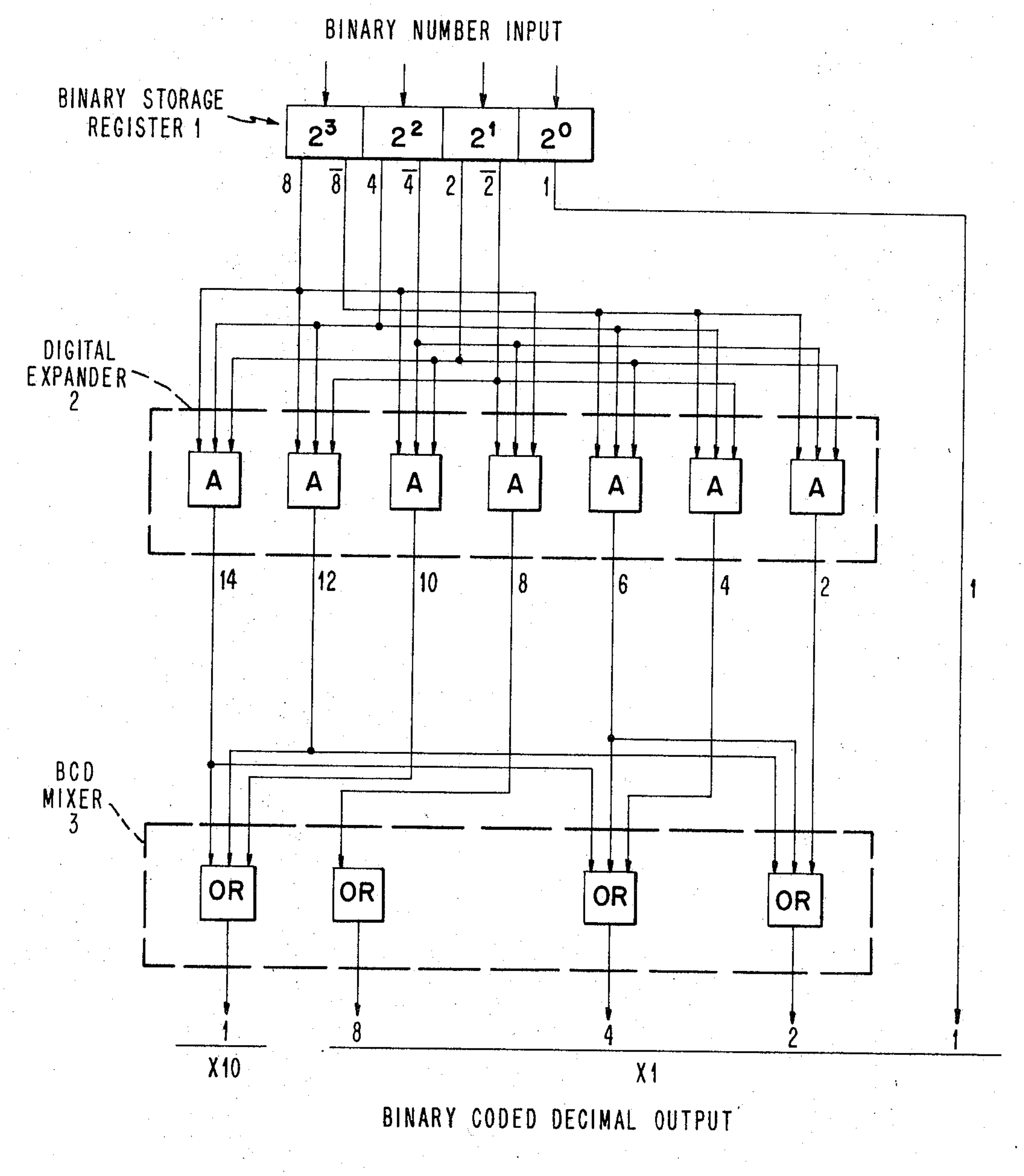
FIG. 1 PRIOR ART
FIG. 1 shows the prior art embodiment of a parallel binary to parallel binary coded decimal converter employing the diode expansion technique.

The output of the apparent first binary storage register is fed as inputs to digital expander 5. Digital expander 5 is constructed and operates in the same manner as does digital expander 2 shown in FIG. 1. The output of digital expander 5 is 63 digital expander output lines each representing a discrete digital number. The 63 discrete digital expander output lines of digital expander 5 are as follows:

TABLE I

0, 4, 16, 20, 64, 68, 80, 84, 256, 260, 272, 276, 320, 324, 336, 340, 1024 1028, 1040, 1044, 1088, 1092, 1104, 1108, 1280, 1284, 1296, 1300, 1344, 1348, 1360, 1364, 4096, 4100, 4112, 4116, 4160, 4164, 4176, 4180, 4352, 4356, 4368, 4372, 4416, 4420, 4432, 4436, 5120, 5124, 5136, 5140, 5184, 5188, 5200, 5204, 5376, 5380, 5392, 5396, 5440, 5444, 5456, and 5460.

It should be noted that only one of these digital expander output lines can be activated at any given time.

The 63 digital expander output lines of digital expander 5 act as inputs to the BCD mixer 7. It should be noted that the BCD mixer 7 is constructed in the same fashion and operates in the same mode as does BCD mixer 3 in the prior art. The BCD mixer 7 partitions the activated digital expander output line of digital expander 5 into its BCD component parts. There are 12 BCD mixer output lines from BCD mixer 7. These BCD mixer output lines are 2, 4, 8, 10, 20, 40, 80, 100, 200, 400, 1,000, 4,000. It should be noted that one or more of the BCD mixer output lines of the BCD mixer 7 will be activated to represent the digital expander output line from digital expander 5. An an example, if digital expander 5 digital expander output line representing decimal number 5,460 was activated, BCD mixer output lines 4,000, 1,000, 400, 40, and 20 of BCD mixer 7 will be activated to represent this digital value input.

In like manner digital expander 6 expands its six input lines from the second apparent binary storage register into 63 discrete digital expander output lines. Digital expander 6 is constructed in the same fashion and operates in the same mode as does digital expander 2 in the prior art. It should be noted that only one of the 63 digital expander output lines of digital expander 6 can be activated at any given time. The decimal value of the 63 digital expander output lines of digital expander 6 are as follows:

TABLE II

2, 8, 10, 32, 34, 40, 42, 128, 130, 136, 138, 160, 162, 168, 170, 512, 514, 520, 522 544, 546, 552, 554, 640, 642, 648, 650, 672, 674, 680, 682, 2048, 2050, 2056, 2058, 2080, 2082, 2088, 2090, 2176, 2178, 2184, 2186, 2208, 2210, 2216, 2218, 2560, 2562, 2568, 2570, 2592, 2594, 2600, 2602, 2688, 2690, 2696, 2698, 2720, 2722, 2728, and 2730.

The 63 digital expander output lines from digital expander 2 act as inputs to BCD mixer 8. Once again BCD mixer 8 is constructed in the same fashion and operates in the same mode as does BCD mixer 3 in the prior art. BCD mixer 8 partitions the activated digital expander output line from digital expander 6 into its BCD component parts. BCD mixer 8 has eleven BCD mixer output lines. The eleven BCD mixer output lines have BCD values as follows: 2, 4, 8, 10, 20, 40, 80, 100, 200, 400, and 2000.

It must be realized at this time that the output of BCD mixer 7 represents in binary coded decimal form the BCD equivalent of the binary number stored in the first apparent binary storage register. In a similar fashion the output of BCD mixer 8 represents in binary coded form the binary coded decimal equivalent of the binary number that was stored in the second apparent binary storage register. It should be remembered that the two apparent binary storage registers are actually contained in the single binary storage register 4. Binary storage register 4 is made to appear as two separate binary storage registers by the assignment of the outputs of each of the binary indicator stages $2^1$–$2^{12}$ which comprise binary storage register 4 as inputs to one and only one of the digital expanders that are used in the apparatus.

The BCD output lines from BCD mixer 7 and mixer 8 are added together by adder circuitry 9. One method of adding these two BCD numbers together is to use a look ahead correction circuitry in conjunction with a functional binary adder. This method departs from the normal mode of BCD adding by interrogating the BCD numbers themselves to determine and generate the necessary correction factors that are needed to correct the sum of the two BCD numbers into correct BCD form.

With the necessary correction factors generated, a functional binary adder can be used to add the two BCD numbers and the correction factors to obtain a corrected BCD equivalent of the summation of the two BCD numbers added. It can be realized that by using this technique the sum of the two BCD numbers will be the BCD equivalent of the binary number stored in the binary storage register 4.

In order to ease bookkeeping at this point in the description, an output line from BCD mixer 7 will be designated with A and an output line from BCD mixer 8 will be designated with a B. For example, the output line designated 100A means that the line represents a BCD value of 100 and which originated from BCD mixer 7. The criteria used to determine if a correction is needed can be stated by the following logic statement where a dot represents an AND function and the plus an OR function. The C refers to a carry from a low order. Whenever one of the following expressions is satisfied, a "6" (4+2) is added to the particular order.

The criteria for the units position is as follows:

$$8A.(8B+4B+2B)+8B.(8A+4A=2A)+4A.4B.(2A+2B)$$

The correction criteria for the tens position is as follows:

$$80A.(80B+40B+20B)+80B.(80A+40A+20A)+40A.40B.(20A+20B)+(40A+40B).20A.20B.20C$$

The correction criteria for the hundreds position is as follows:

$$400A.400B.(200A+200B)+(400A+400B).200A.200B.200C$$

Figure 3:
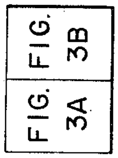
FIGS. 3, 3*a*, 3*b* show the logic diagram for the look ahead carry correction circuitry and binary adder used in the adder circuitry in the first embodiment shown in FIG. 2.
Figure 3A:
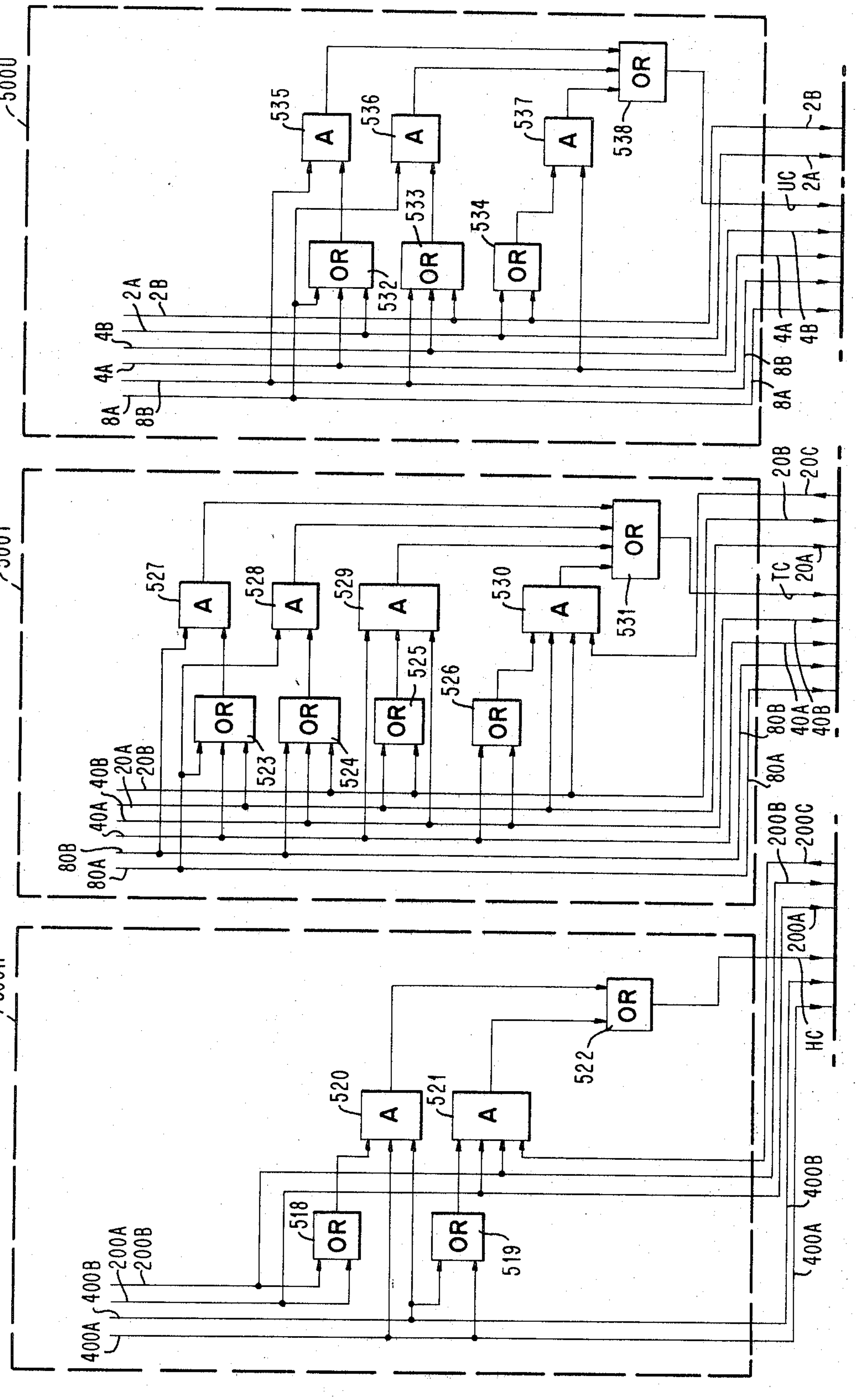
Figure 3B:
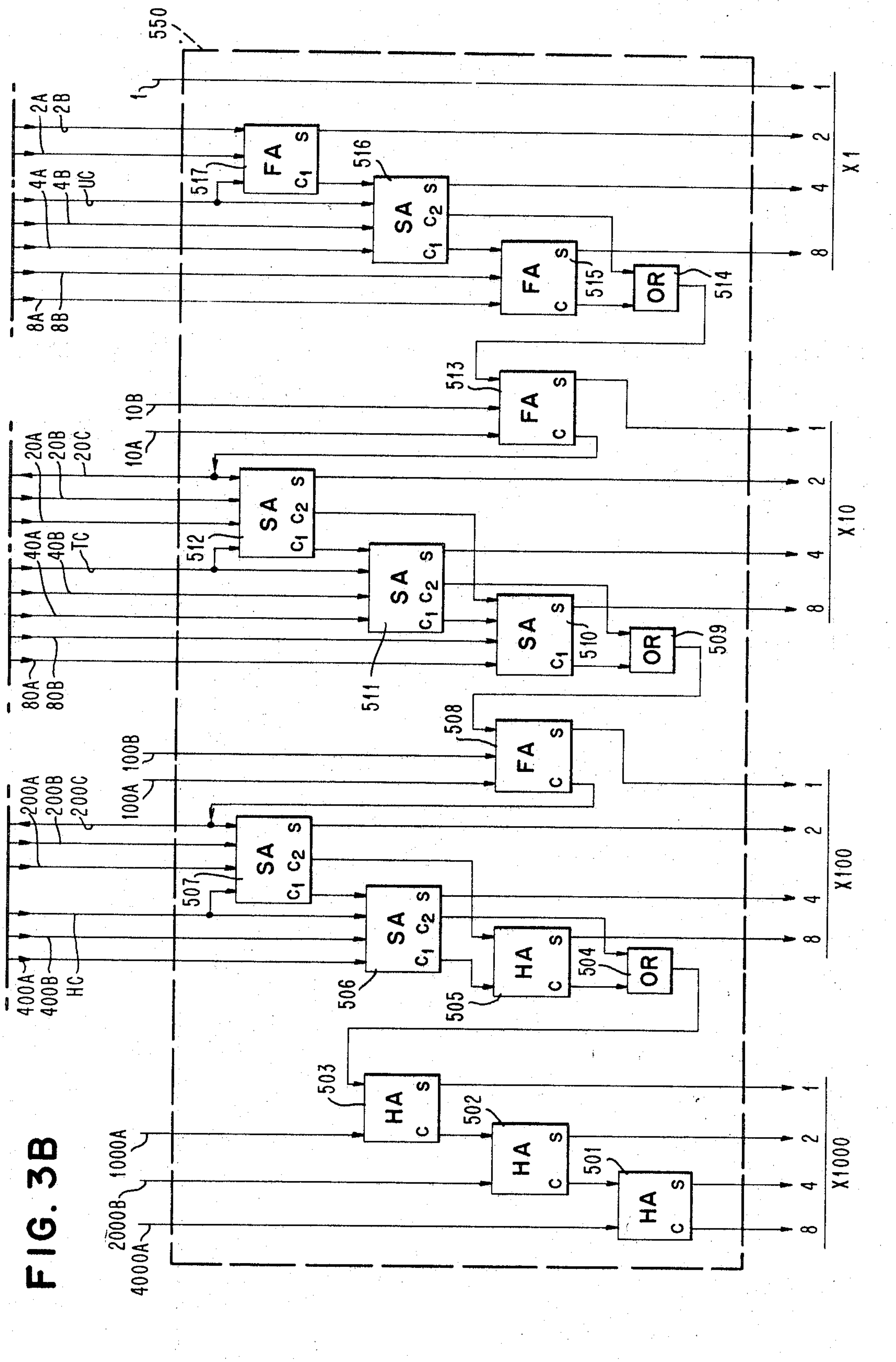

Referring to FIG. 3 the logic necessary to carry out the criteria for the units place is shown in 500 U, the logic necessary to carry out the correct for the tens place is shown in 500T and the logic necessary to carry out the correction in the hundreds place is shown in 500H.

It is the purpose of the functional binary adder 550 to add the outputs from BCD mixer 7, BCD mixer 8, and the corrections generated by the hundreds place correction circuit 500H, the tens place correction circuit 500T and by the units place correction circuit 500U. The functional binary adder 550 output is the BCD equivalent of the binary number stored in the input storage register 4.

The functional binary adder 550 contains half adders, full adders and super adders. The construction and logic operation of half adders and full adders is well known as exemplified in R. K. Richard's book "Digital Computer Components and Circuits."

It is characteristic of one type of super adder to have seven inputs and three outputs. The three outputs are (1) the summation output S which is equal to the mode 2 summation of the seven inputs, (2) a first order binary carry $C_1$ and (3) a second order binary carry $C_2$.

A discussion of super adders, their consrtuction and logic operation can be found in my copending application Ser. No. 683,198 entitled "Multiple Input Binary Adder," Within this application, a method of connecting SA to form a function binary adder is described. The functional biniry adder 550 is a specific embodiment of the teachings in my copending application. It is felt that it would be well within the state of the art to design the functional binary adder 550 from the teachings of my copending application.

It should be further realized that other multiple input binary adders taught in my copening application could be directly used as the functional binary adder 550 if so desired.

A full understanding as to the operation of functional binary adder 550 can be obtained from the description of the operation of the first embodiment to follow.

Another way of correctly adding together two BCD numbers would be to use a BCD adder containing the necessary circuitry for addition and correction that must be performed to obtain the correct addition of the two BCD numbers. These BCD adders and their associated correction circuitry are well known in the art. Such a BCD adder is taught in 'Computer Logic, The Functional Design of Digital Computers" by Ivan Flores, pp. 182–187, which embodies specific teachings as to the construction of a BCD adder having the necessary correction circuitry. The output of the adder circuitry will be the BCD equivalent of the binary number stored in the binary storage register 4. It must be noted, however, that this method is slower since it entails the use of two functional binary adders within the BCD adder.

OPERATION OF THE FIRST EMBODIMENT

In order to fully show the operation of embodiment 1 of the parallel binary to parallel binary coded decimal converter, a specific example will be used. Assume that the thirteen bit binary number 1111111111111 is the input to the binary storage register 4 to be translated into its BCD equivalent. This 13 bit binary number has a decimal equivalent of 8,191 and a BCD equivalent of 1000(×1000)0001(×100)1001(×10)0001(×1). With the 13 bit binary number stored in the binary storage register 4 all of the binary indicator output lines will be activated.

The six input lines from the first apparent storage register to digital expander 5 will be activated. It should be noted that the six input lines into igital expander 5 represent the binary number 1010101010100. Digital expander 5 will decode the six inputs and activate the digital expander output line representing digital value 5,460. With digital expander output line associated with digital value 5,460 activated, BCD mixer 7 will activae BCD mixer output lines representing 4,000, 1,000, 400, 40 and 20. he output of BCD mixer 7 will appear as BCD number

0101(×1000)0100(×100)0110(×10)0000(×1)

This BCD number is the BCD equivalent of the 13 bit binary number inputed into digital expander 5 from the first apparent binary storage register.

In like manner the six inputs from the second apparent binary storage register to digital expander 6 will all be acivated. The binary number inputed to digital expander 6 is 0101010101010. With the six input lines all activated digital expander 6 will activate digital expander output line associated with digital value 2,730.

With input decimal value of 2,730, BCD mixer 8 will activate BCD mixer output lines 2,000, 400, 200, 100, 20 and 10. The BCD mixer output lines of BCD mixer 8 will represent the BCD number

0010(×1000)0111(×100)0011(×10)0000(×1)

This BCD number is the BCD equivalent of the binary number entered into digital exanpder 6 from the second apparent binary storage register. The BCD number represented by the output of BCD mixer 7 and the BCD number represented by the output of BCD mixer 8 are added together in adder circuitry 9. The output of adder circuitry 9 should be $$1000(\times 1000)0001(\times 100)1001(\times 10)000(\times 1)$$

Applying the three correction criteria to the specific example being used, there will be no correction factor generated by the unit correction circuitry 500 U. There may be a correction factor generated by the tens place correction circuitry 500 U if the portion of that criteria $(40A+40B).20A.20B.20C$ is met by the existence of 20C. A correction factor is generated by the hundred place correction circuitry 500 H since the portion of the correction criteria $400A.400B.(200A+200B)$ is met.

Now referring to FIG. 3, the functional binary adder 550 is where the final steps in the conversion of the binary number in the binary storage register 4 to its BCD equivalent is accomplished. FA 517 having all its inputs zero since 2B, 2A and correction UC from 500 U are all zero, will have an output S equal to zero and carry $C_1$ equal to zero. In like manner, super adder 516 having its inputs 4A, 4B, correction UC from 500 U and carry C from FA 517, all equal to zero, will have its output S equal to zero and no first or second order carry. FA 515 having as its inputs 8A, 8B, and first order carry $C_1$ from SA 516 all being equal to zero will have its output S equal to zero and no carry.

The input to OR circuit 514 having the first order carry C from FA 515 and the second order carry $C_2$ from SA 516 both being zero, will have an output signal of zero to FA 513. FA 513 having its input 10A and the output from OR circuit 514 equal to zero and its input 10B equal to one, will have an output signal S of 1 and no carry. The carry of FA 513 is the input 20C to the tens place correction circuitry 500T and is equal to zero. Therefore, no correction signal is generated by the tens place correction circuitry 500T. SA 512 having as its inputs a zero from correction TC from the tens place correction circuitry 500T, a zero from C of FA 513 and 1's from both 20A and 20B will have an output signal S of zero, a first order carry $C_1$ equal to one and a second order carry $C_2$ equal to zero. SA 511 having its inputs 40B and correction TC from the tens place correction circuitry 500T equal to zero, 40A and first order carry $C_1$ from SA 512 equal to one, will have an output signal S equal to zero, a first order carry $C_1$ equal to one and a second order carry $C_2$ equal to zero. SA 510 having its inputs 80A, 80B, and second order carry $C_2$ from SA 512 equal to zero and a first order carry $C_1$ from SA 511 equal to one, will have an output signal S equal to one and no first order or second order carry.

OR circuit 509 having as its input the first order carry $C_1$ of SA 510 and the second order carry $C_2$ of SA 511 both being equal to zero, will have an output value equal to zero. FA 508 having as its input 100A and the output of OR circuit 509 both being equal to zero and 100B is equal to one, will have an output S equal to one and no first order carry C. SA 507 having as its inputs 200A and first order carry C from FA 508 equal to zero, its inputs 200B and the correction HC from the hundreds place correction circuit 500H equal to one, will have an output signal S equal to zero, a first order carry $C_1$ equal to one and a second order carry $C_2$ equal to zero. SA 506 having as its input 400A, 400B, the first order carry $C_1$ from SA 507 and the correction HC from the hundred position correction circuitry 500H all equal to one, will have an output signal S of zero, a first order carry of $C_1$ equal to zero and a second order carry $C_2$ equal to one. HA 505 having as its input the first order carry $C_1$ of SA 506 and the second order carry $C_2$ of SA 507 both equal to zero, will have an output S equal to zero and a carry C equal to zero.

OR circuit 504 having as its inputs the first order carry C from HA 505 equal to zero and the second order carry $C_2$ from SA 506 equal to one, will have an output signal equal to one. HA 503 having as its input 1000A and the output of OR circuit 504 both equal to one, will have an output signal S equal to zero and a first order carry C equal to one. HA 502 having as its inputs 2000B and first order carry C from HA 503 both equal to one will have an output S equal to zero and a first order carry C equal to one. HA 501 having as its input 4000A and a first order carry C from HA 502 both equal to one will have an output signal S equal to zero and a first order carry C equal to one.

It should be noted that the first order output S of each adder regardless of type used in the functional binary adder 550 will be a distinct binary position in a decimal place of the BCD equivalent of the binary number stored in the binary storage register 105. These distinct output lines for output S of each adder will be the apparatus binary coded decimal output lines of the parallel binary to parallel binary coded decimal converter.

The output of the functional binary adder 550 is the output of the converter except for the $2^0$ position of the unit place of the BCD number. As stated in the discussion of the prior art, the $2^0$ term of the number stored in the binary storage register 4 need not be expanded since it only provides odd/even information as to the binary coded decimal number. Further the $2^0$ bit of the binary number stored in the binary storage register 4 is the value of the $2^0$ bit of the unit place of the binary coded decimal number that is the equivalent of the binary number stored in the binary storage register 4. Therefore the output of the apparatus represents the binary coded decimal number $1001(\times 1000)0001(\times 100)1001(\times 10)001(\times 1)$ since the binary indicator stage $2^0$ was set to a 1. It can therefore be seen that this output of the converter represents the BCD equivalent of the binary number stored in the binary storage register 4.

Digital expander 5 employs 400 diodes. BCD mixer 7 and BCD mixer 8 each expand 63 digital lines having on the average 4 BCD components. On this basis BCD mixer 7 and BCD mixer 8 employ approximately 500 diodes. It therefore takes approximately 1300 diodes to perform the necessary digital expansion and BCD mixing in this apparatus. It should be noted, however, that in the prior art to expand 13 binary bits, it would necessitate approximately 50,000 diodes to perform the necessary digital expansion and another 12,000 to provide the necessary BCD partitioning. The total number of diodes necessary to perform the digital expansion and BCD mixing is approximately 66,000 diodes. It therefore can be realized that this apparatus at a level of 13 bits provides a saving of 98% of the components used by the prior art method.

DETAILED DESCRIPTION OF EMBODIMENTS 2

A second embodiment of the invention is shown to describe the breadth and versatility of the invention. Once again the binary storage register contains 13 bits. It should be noted that the 13 bits are not a limiting factor and in fact this embodiment would be used with binary numbers having significantly more bits than 13 such as binary numbers having 29 bits. A 13 bit register is used only for example purposes.

It can be realized that if the apparatus was limited only to partitioning the binary storage register into two apparent binary storage registers than the number of diodes necessary to provide a conversion of a binary number to its BCD equivalent would find itself bounded by the mammoth amount of diodes necessary to provide the necessary digital expansion and BCD mixing function as the binary number to be converted continues to grow. It is therefore desirable to be able to partition the binary storage register into more than two apparent binary storage registers. As can be seen by the second embodiment this can be accomplished. In a general sense the binary storage register can be partitioned into as many apparent binary storage registers as is desired as long as the basic criteria that each binary indicator stage of the binary storage register be connected to one and only one digital expander.

Figure 4:
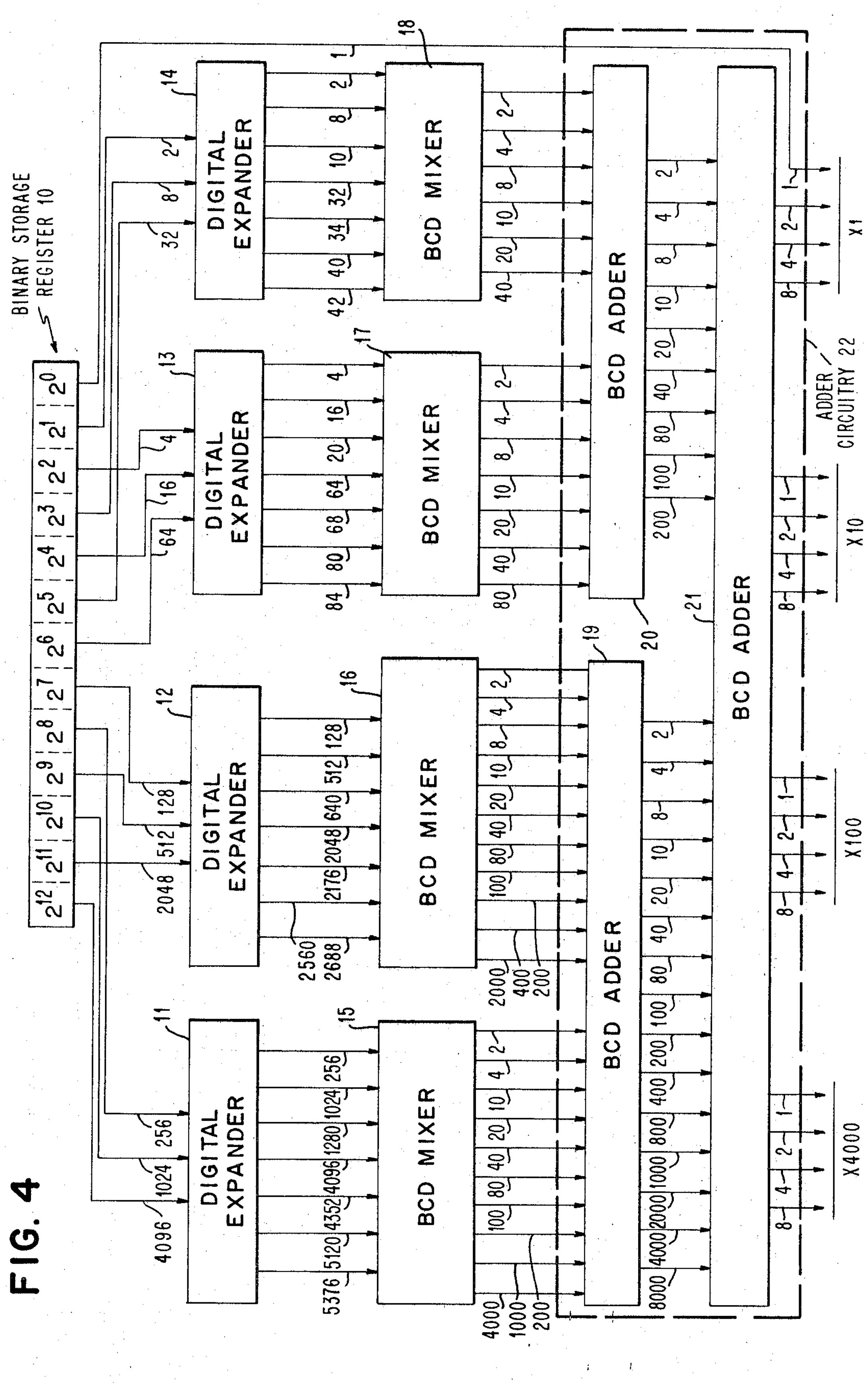
FIG. 4 shows a second embodiment of the inproved parallel binary to parallel binay coded decimal converter.

In reference to FIG. 4, the second embodiment of the invention is shown. Binary storage register 10 consists of 13 binary indicator stages $2^0$–$2^{12}$ and is constructed and operates in a similar manner as binary storage register 4 in embodiment 1.

Binary storage register 10 is partitioned to form four apparent binary storage registers. The first apparent binary storage register consists of binary indicator stages $2^{12}$, $2^{10}$ and $2^8$ and are connected as inputs to digital expander 11. The second apparent binary storage register consists of binary indicator stages $2^{11}$, $2^9$ and $2^7$ and acts as inputs to digital expander 12. The third apparent binary storage register consists of binary indicator stages $2^6$, $2^4$ and $2^2$ which acts an an input to digital expander 13. The fourth apparent binary storage register consists of binary indicator stages $2^5$, $2^3$ and $2^1$ which act as inputs to digital expander 14.

Each digital expander will expand its three decimal inputs into seven decimal output lines. Each BCD mixer will partition the seven digital output lines of the associated digital expander into their BCD component values. All digital expanders and BCD mixers are constructed and operate in the same mode as in embodiment 1.

The BCD number represented by the outputs from the four BCD mixers 15, 16, 17 and 18 are connected as inputs to adder circuitry 22. Adder cricuitry 22 consists of three separate BCD adders 19, 20, 21 to provide the proper addition of the outputs from the four BCD mixers 15, 16, 17 and 18. The BCD number represented by the output of BCD mixer 15 is added to the BCD number represented by the output of BCD mixer 16 in BCD adder 19. Similarly the BCD number represented by the output of BCD mixer 17 is added to the BCD number represented by the output of BCD mixer 18 by BCD adder 20. The outputs of BCD adder 19 and BCD adder 20 are added by BCD adder 21 to obtain the BCD equivalent value of the binary number stored in the binary storage register 10.

The BCD adders 19, 20, and 21 are of the same type as referenced to in the prior art. The look ahead correction circuitry and the functional binary adder was not used in this embodiment so as to demonstrate the use of well known BCD adder in adder circuitry 22. The adder circuitry used in embodiment 1 of the invention could be used with slight modification in embodiment 2.

OPERATION OF EMBODIMENT 2

To fully show the operation of embodiment 2 of the parallel to parallel binary coded converter the specific example for embodiment 1 will again be used. Assuming the same 13 bit binary number consisting of all 1's having a decimal value of 8,191 and a BCD equivalent of 1000(×1000)0001(×100)1001(×10)0001(×1) is used. This binary number stored in the binary storage register 10 will cause all binary indicator output lines to be activated. The three activated inputs to digital expander 11 will activate digital expander output line 5,376 of digital digital expander 11. In a similar manner digital expander 12 output line 2,688, digital expander 13 output line 84 and digital expander 14 output line 42 will all be activated.

With the digital expander output line representing 5,376 activated by digital expander 11, BCD mixer 15 will activate output BCD mixer lines 4,000, 1,000, 200, 100, 40, 20, 10, 4, and 2. The BCD number represented by BCD mixer 15 is 0101(×1000)0011(×100)0111(×10)0110(×1). In like manner, BCD mixers 16, 17 and 18 will expand their activated input digital expander output lines into its BCD components. The BCD number represented by the BCD mixer 16 will be 0010(×1000)0110(×100)1000(×10)1000(×1). The BCD number represented by the output of BCD mixer 17 will be 1000(10)0100(×1). The BCD number represented by the output of BCD mixer 18 will be 0100(×10)0010(×1). The BCD mixer output lines of BCD mixer 15 are added to the BCD mixer output lines of BCD mixer 16 by BCD adder 19. The output of BCD adder 19 will represent the BCD number 1000(×1000)0000(×100)0110(×10)0100(×1) and which has a decimal value of 8,064. The BCD mixer output lines of BCD mixer 17 and the BCD mixer output lines of BCD mixer 18 will be added together by BCD adder 20. The output of BCD adder 20 will represent the BCD number 0001(×100)0010(×10)0110(×1) and will have a decimal value of 126.

The output of BCD adder 19 and the output of BCD adder 20 will be added together by BCD adder 21. The output of adder 21 will represent BCD number 1000(×1000)0001(×100)1001(×10)0000(×1) and will have a decimal value of 8,190.

The output of BCD adder will be the output of the apparatus except for the $2^0$ position of the unit place of the BCD number. As in embodiment 1 the $2^0$ position of the output of the apparatus will be dictated by the binary indicator stage $2^0$ associated with $2^0$ position of the binary number stored in binary storage register 10. The final output of the apparatus will therefore represent a BCD number of 100(×1000)0001(×100)1001(×10)0001(×1).

It should be noted that it was necessary to employ three BCD adders to obtain the correct addition of the four BCD numbers that were represented by the outputs of the four BCD mixers. It will be necessary to use one less adder than the number of BCD mixers used in the apparatus to obtain the summation of the outputs of the plurality of BCD mixers. For example, if three BCD mixers were used then only two BCD adders would be necessary. The first BCD mixer with the output of the second BCD mixer. The second BCD adder would add the output of the first BCD adder and the output of the third BCD mixer to obtain the output of the apparatus except for the $2^0$ bit of the unit position of the BCD number.

A further saving in components and complexity of the apparatus can be obtained by using a BCD adder capable of adding more than two BCD numbers at the same time. Such a BCD adder is shown in my copending application Ser. No. 683,198, entitled "Multiple Input Binary Adder." One such BCD adder disclosed in this application has the capability of adding up to six BCD numbers simultaneously. This multiple input BCD adder can be directly substituted for the BCD adders 19, 20 and 21 used in adder circuitry 22.

The number of multiple input BCD adders necessary to form adder circuitry 22 is a function of the number of BCD mixers used in the apparatus. The number of multiple input BCD adders needed is equal to the expression.

$$\left[1+\frac{(n-6)}{5}\right]$$

when $n$ is the number of BCD mixers, and the value of $$\frac{(n-6)}{5}$$

has meaning only for positive values and should be treated as zero for all negative values. The value obtained is always rounded off to the next full integer for any fractional value that may exist. For example if $n$ eqauls 17 then the values of the expression are 1+2.2 or 3.2. The 3.2 would be rounded to 4 and therefore four multiple input BCD adders would be needed.

Each digital expander employed 21 diodes to perform the required digital expansion. Therefore to perform desired digital expansion a total of 84 diodes were necessary. Using the same criteria as in embodiment 1 that each output line of the digital expander on the average is composed of four BCD components, there being in total 28 output lines from all digital expanders, it would be necessary to use 132 diodes for the BCD mixing. Therefore, only 200 diodes were necessary to perform the digital expansion and the BCD mixing within this embodiment of the invention.

Illustrated in the discussion of embodiment 1, the prior art method would incorporate approximately 66,000 diodes to perform the digital expansion and BCD mixing. It is therefore evident that a saving of 99.7% of the components used was obtained by partitioning the binary storage register 10 into four units. The added expense of the three BCD adders is far outweighed by the savings in components and in the cost of the components themselves.

While the invention has been particularly shown and described with reference to preferred embodiments thereof, it will be understood by those skilled in the art that various changes in form and detail may be made therein without departing from the spirit and scope of the invention.

What is claimed is:

1. An apparatus for converting a plurality of binary input bits having individual binary weighted values to represent an input number in binary code into a binary coded decimal code representation of the input number comprising:

- a binary storage register comprised of a plurality of binary indicator stages for storing said input number, each of said plurality of binary indicator stages always being associated with the same binary input bit of said plurality of binary input bits of said input number;
- a binary indicator stage output line for each of said binary indicator stages, which represents the binary weighted value of the binary input bit of said plurality of binary input bits which said binary indicator stage is associated with;
- a plurality of apparatus binary coded decimal weighted output lines, each of said plurality of apparatus binary coded decimal weighted output lines represents a discrete binary coded decimal value;
- a first connecting means for connecting said binary indicator stage output line of said plurality of binary indicator stages having a binary weighted value of $2^0$ to the apparatus binary coded decimal weighted output line of said plurality of apparatus binary coded decimal weighted output lines which represent the $2^0$ position of the unit place of the binary coded decimal code representation of said input number;
- a plurality of digital expanders;
- a second connecting means to connect each of the remaining said binary indicator stages of said binary storage register to one of said plurality of digital expanders to act as inputs to each of said plurality of digital expanders;
- a plurality of digital expander output lines for each of said digital expanders which represent all the discrete decimal values obtained by forming all the combinations and permutations of said inputs from said plurality of binary indicating stages of said binary storage register, where only one of said plurality of digital expander output lines from each of said plurality of digital expanders can be activated at any given time;
- a plurality of BCD mixers;
- a third connecting means for connecting all said plurality of digital expander output lines from each of said plurality of digital expanders to one of said plurality of BCD mixers to act as inputs to said one of said plurality of BCD mixers;
- a plurality of BCD mixer output lines for each of said plurality of BCD mixers, said plurality of BCD mixer output lines represent all the BCD weighted values represented in said plurality of digital expander output lines which act as said inputs to said one of said plurality of BCD mixers, a plurality of the plurality of BCD mixer output lines for each of said plurality of BCD mixers being activated to represent the BCD weighted values of said respective activated digital expander output lines of said plurality of digital expander output lines for each of said plurality of digital expanders;
- adding means for combining all of said activated BCD mixer output lines from said plurality of BCD mixers;
- a fourth connecting means for connecting all of said BCD mixer output lines from all of said plurality of BCD mixers to said adding means to act as inputs to said adding means;
- a plurality of adding means output lines, each of said adding means output lines having a discrete BCD weighted value;
- a fifth connecting means for connecting the plurality of adding means output lines to their corresponding said apparatus binary coded decimal weighted output line of said plurality of apparatus binary coded decimal weighted output lines, except for the $2^0$ position of the unit place of said binary coded decimal code representation of said input number stored in said binary storage register, the activated apparatus binary coded decimal weighted output lines representing the binary coded decimal code representation of the input number stored in the binary storage register at any given time.

2. An apparatus as set forth in claim 1 wherein said inputs to each of said plurality of digital expanders have a binary weighted value represented with it of either all even or all odd powers of 2.

3. An apparatus as set forth in claim 1 wherein said adding means includes look ahead correction circuitry in conjunction with a functional binary adder.

4. An apparatus as set forth in claim 3 wherein said functional binary adder comprises the use of super adders.

5. An apparatus as set forth in claim 1 wherein said adding means comprises the use of look ahead correction circuitry in conjunction with a multiple input binary adder.

6. An apparatus as set forth in claim 1 wherein said adding means comprises the use of BCD adders, the minimum number of BCD adders needed being represented by one less than the number of said BCD mixers that is employed within said apparatus.

7. An apparatus as set forth in claim 1 wherein said adding means consists of multiple input binary coded decimal adders, capable of adding up to six BCD numbers simultaneously, the minimum number of multiple input binary coded decimal adders being determined by the expression $$\left[1-\frac{(n-5)}{5}\right]$$

where $n$ represents the number of BCD mixers being employed in the apparatus, where $$\frac{(n-6)}{5}$$

whenever the expression is equal to zero or a negative number, and where the final value of the expression is rounded off to the next whole integer for any functional part of an integer that may exist.

References Cited

UNITED STATES PATENTS

| | | | |
|---|---|---|---|
| 3,237,185 | 2/1966 | Yen | 340—347 |
| 3,242,323 | 3/1966 | Marasco | 235—155 |

MAYNARD R. WILBUR, Primary Examiner

J. GLASSMAN, Assistant Examiner

U.S. Cl. X.R.

340—347